Patented Feb. 10, 1925.

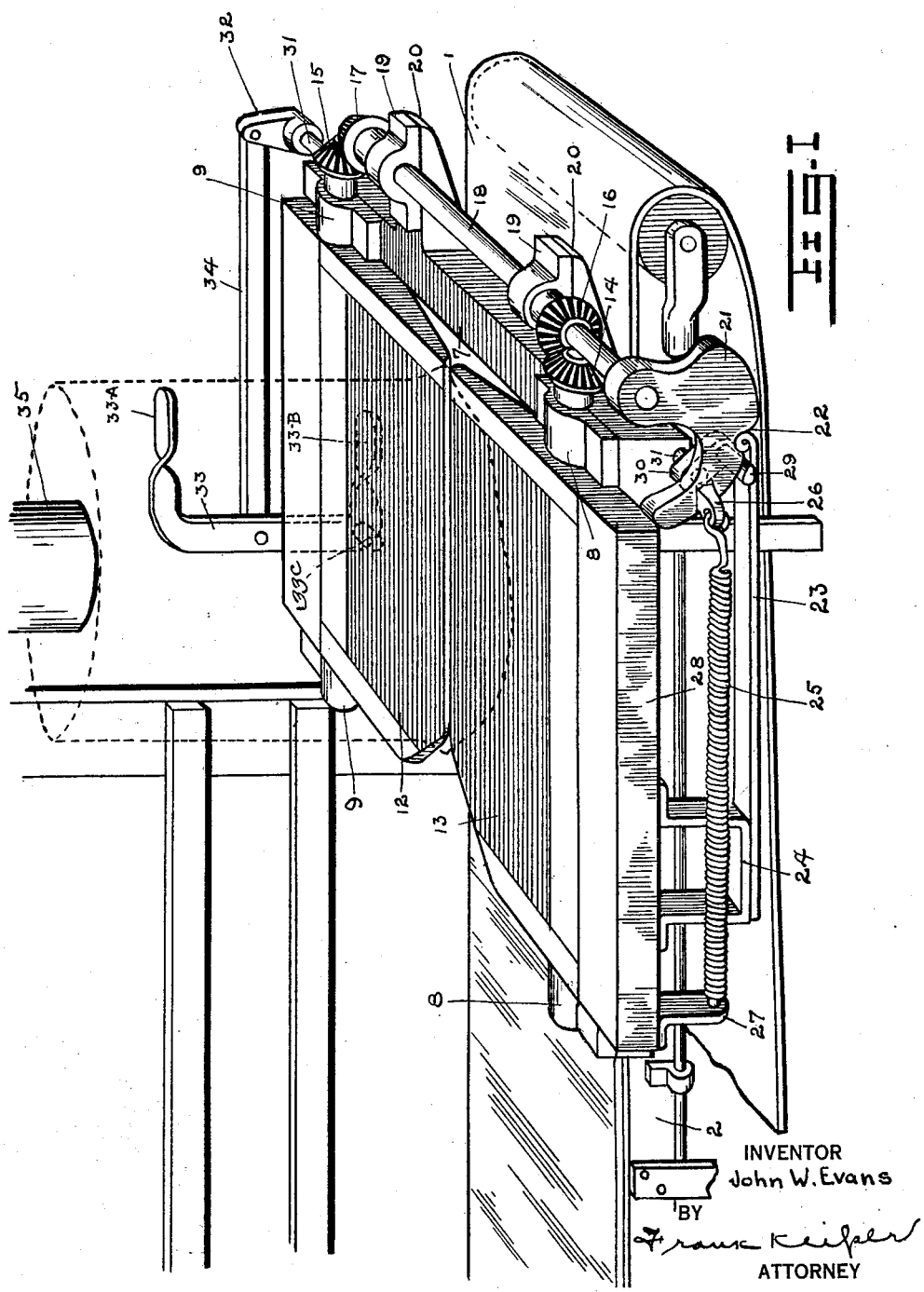

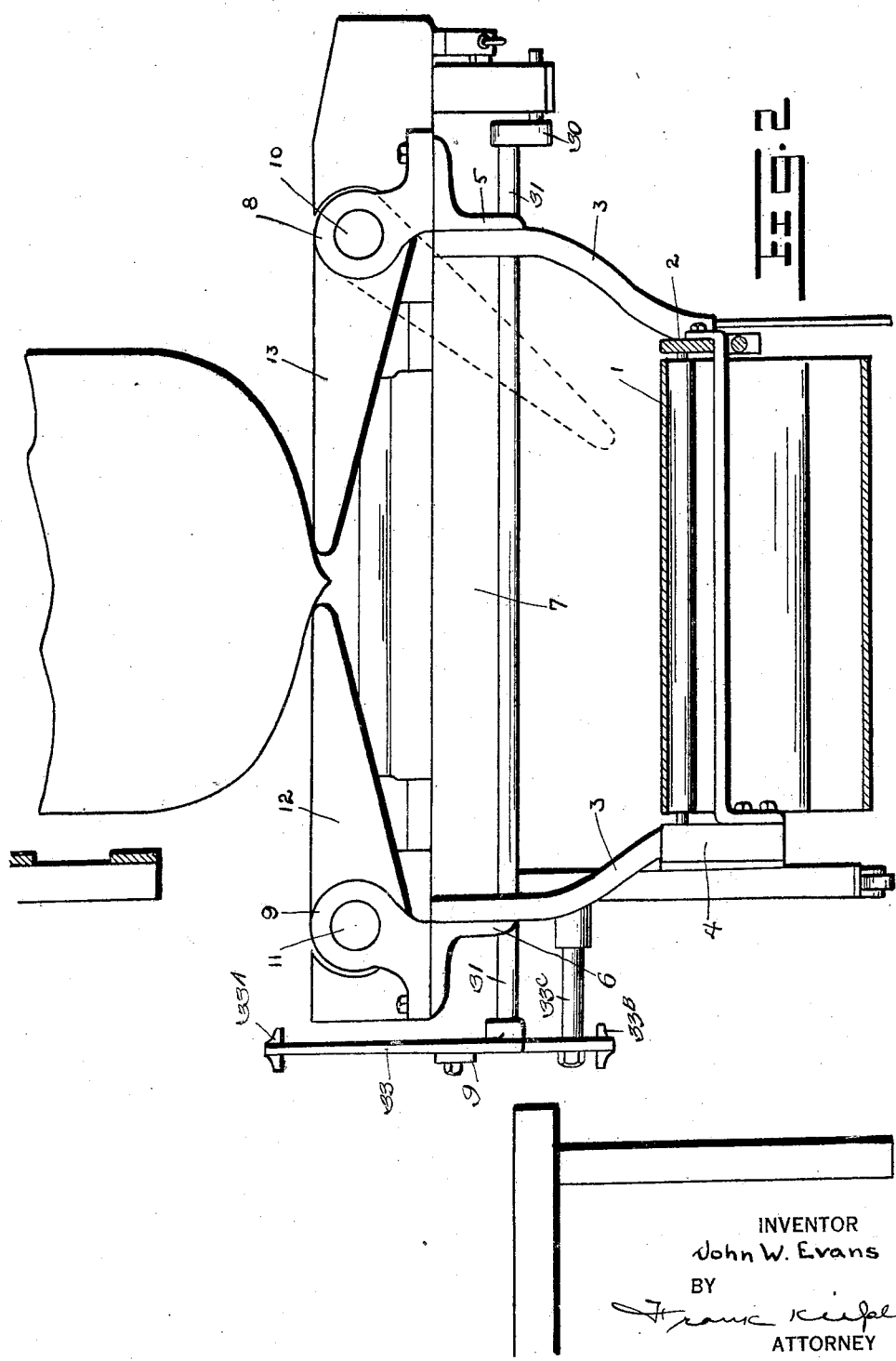

1,525,927

UNITED STATES PATENT OFFICE.

JOHN W. EVANS, OF RETSOF, NEW YORK.

SUPPORTING APPARATUS.

Application filed November 6, 1922. Serial No. 599,321.

*To all whom it may concern:*

Be it known that I, JOHN W. EVANS, a citizen of the United States, residing at Retsof, town of York, in the county of Livingston and State of New York, have invented certain new and useful Improvements in Supporting Apparatus, of which the following is a specification.

The object of this invention is to provide an apparatus which will support bags, sacks, etc. above a moving conveyor while the bags or sacks are being filled without interfering with the movement of the conveyor and after the sacks are filled the apparatus will be operated to drop them onto the conveyor.

These and other objects of this invention will be fully illustrated in the drawings, described in the specification and pointed out in the claims at the end thereof.

In the accompanying drawing:

Figure 1 is a perspective view of the supporting apparatus.

Figure 2 is an end elevation of the apparatus.

In the several figures of the drawings like reference numerals indicate like parts.

The apparatus forming the subject matter of this invention is especially adapted for use in filling bags or sacks with salt or similar material. The function of the apparatus is to support the bag or sack above a moving endless belt or conveyor until it is filled, after which the bag or sack is dropped onto the moving conveyor and carried away from the apparatus, making room for the next bag or sack to be supported thereon for filling. Heretofore it has been necessary to support the sack or bag on a stationary platform until it was filled and then lift the sack by hand and place it on the conveyor. This not only was a slow operation but it also required considerable strength on the part of the men who handled the sacks. It required two crews of men working alternately who changed off at short intervals to do this same work that is now being done by only one crew using this apparatus in a shorter time and with less effort.

As illustrated in the figures, the apparatus is built to straddle the end of a belt conveyor 1. This conveyor may be any one of the well-known types of belt conveyors used to convey heavy articles from one place to another. The belt conveyor shown with its frame and rollers is supported on suitable legs a short distance above the floor. Supported from the side rails 2 of this conveyor by means of the uprights 3 is the frame 4 of the apparatus. This frame is rectangular in outline being made up of the side rails 5 and 6 and the cross rail 7. On this frame are mounted two pairs of bearing blocks 8, 8 and 9, 9 in which the parallel shafts 10 and 11 are mounted to oscillate. Suitably keyed to each of the shafts 10 and 11 is a section of the platform, section 12 being mounted on the shaft 11 and section 13 being mounted on the shaft 10. These platform sections are normally horizontal at the top but incline upwardly on the bottom from the supporting shaft toward the outer end of the platform sections.

Keyed to the end of the shafts 10 and 11 at the right hand end of the platform are the bevel gears 14 and 15. These bevel gears are adapted to mesh with the bevel gears 16 and 17 keyed to the transverse shaft 18. The shaft 18 is mounted to rotate in a pair of bearing blocks 19, 19 that are supported on the brackets 20, 20 formed on and projecting rearwardly from the cross rail 7. Also keyed to the shaft 18 is the segmental locking dog 21. This dog has a notch 22 formed in the periphery thereof for the purpose of receiving the upturned end of the blade spring 23. This engagement of the end of the spring 23 into the notch 22 of the locking dog 21 holds the shaft 18 and in turn holds the shafts 10 and 11 with the platform sections 12 and 13 in a horizontal position to form the platform which supports a sack or bag.

Mounted on the under side of the platform extension is the depending frame 24 to which the blade spring 23 is fastened at one end. At the other end the spring engages the locking dog 21 as above pointed out. The locking dog 21 is normally held in the position shown with the notch 22 in engagement with the upturned end of the spring 23 by the coiled spring 25. This spring is fastened at one end to the outwardly projecting lug 26 formed on the dog 21 and at the other end fastened to the depending lug 27 mounted on the under side of the platform extension 28.

Projecting between the blade spring 23 and the periphery of the locking dog 21 is a crank pin 29. This crank pin is carried on a crank 30 keyed to the end of the shaft 31.

The shaft 31 is mounted in suitable bearings provided in the frame of the apparatus and projects out on the other side of the frame where it has another crank 32 keyed thereon. This last crank is connected with the lever 33 by means of a link 34. The lever 33 is pivoted on the frame of the apparatus at 33$^C$ and has the pedals 33$^A$ and 33$^B$ formed thereon one at the bottom of the lever and the other at the top of the lever so that the lever can be conveniently operated by the foot of the operator at different elevations from the floor on which the apparatus is mounted.

In use the apparatus is placed directly underneath a spout 35 through which the material passes into sacks to be filled. To fill the sacks or bags a man stands at each side of the apparatus and places sacks one at a time under the spout 35. The sack is allowed to rest on the platform and is supported thereby during the filling and all the men need to do is to prevent the sack from tipping over. When the sack is filled the operator nearest the lever 33 steps on one of the pedals of this lever. This rocks the lever, moves the link 34 and turns the crank 32, the shaft 18 and the crank 30 on the other end thereof. As the crank 30 rocks the crank pin 29 thereon depresses the end of the spring 23 and disengages it from the notch 22 in the periphery of the locking dog 21. As soon as the end of the spring releases the locking dog 21 the platform sections are released with it so that the weight of the filled sack depresses the platform sections causing them to swing down and separate so that the sack drops between them onto the endless conveyor belt 1. When the locking dog is released as above pointed out, the platform sections are released together with their bevel gear connection with the shaft 18 on which the locking dog is carried and as the platform sections tilt downwardly due to the weight of the sack thereon, the shafts 10 and 11 are turned and with them the bevel gears 14 and 15. These bevel gears in turn rotate the bevel gears 16 and 17 and the shaft 18 on which these gears are mounted. The locking dog is thus turned so that the notch 22 is moved away from the end of the spring 23, and can no longer be entered by the upturned end of the spring. This, however is only temporary because as the locking dog 21 is turned the expansion spring 23 is stretched and as soon as the sack is carried away from between the platform sections this spring pulls the locking dog back to its original position and on so doing rocks the shaft 18 in the reverse direction and turns the platform sections back into horizontal position through the bevel gear connections. When the platform has been brought back into this normal position the upturned end of the spring 23 can again enter into the notch 22 in the locking dog and hold it against movement in either direction.

As will be seen from an inspection of Figure 1, two of the adjacent corners of the platform sections are cut away to form a V-shaped notch on one side of the platform formed by these sections. This is to expedite the movement of the filled sack from the platform sections after it has been deposited onto the belt conveyor. It has been found in practice that the rear corner of the sack when kept in frictional contact will retard the motion of the sack and that by cutting away the corners of the platform section as above pointed out this frictional contact between the sack and the platform sections is reduced to a minimum.

The conveyor of this apparatus is used to carry the filled sacks to a sewing machine by which the mouth of the sack, through which it has been filled, is sewed shut. For this purpose the sack must be carried to and past the sewing machine in an upright position. The platform keeps the sack in this upright position as it lets it down on the belt and delivers it to the belt and with this start the belt carries the sack in an upright position to the sewing machine. The divided platform puts the central zone of the bottom of the sack into contact with the moving belt and steadies the bag on either side as it moves forward. The bag leaves the end of the platform evenly balanced so that it keeps its correct upright position as it moves away from the platform.

I claim:

1. In a supporting apparatus, the combination of a pair of stationary longitudinal members, a stationary cross member connecting said longitudinal members at one end thereof, a shaft mounted to oscillate above each of said longitudinal members and parallel thereto, a platform section mounted on each of said shafts adapted to oscillate therewith, an operating shaft at right angles to said parallel shafts, gearing connecting said parallel shafts with said operating shaft, a locking dog carried on the end of said operating shaft, a spring latch adapted to engage said locking dog, a crank having a crank pin, said crank pin adapted to engage between said spring latch and said locking dog, said crank pin being adapted to disengage said spring latch from said locking dog on the rotation thereof, means for rotating said crank, a spring connected to said locking dog to move said locking dog back into normal position.

2. In a supporting apparatus, the combination of a frame, a platform supported by said frame, said platform being divided centrally into two sections, said sections being adapted to tilt downwardly and away from each other, the corners of said sections being cut away at one end to form a V shaped recess.

3. In a supporting apparatus, the combination of a frame, a platform supported by said frame, said platform being divided centrally into two sections, said sections being adapted to tilt downwardly and away from each other, the corners of said sections being cut away at one end to form a V shaped recess, a belt running below said sections, said sections normally supporting a sack above the belt and permitting the central portion of the bottom of the sack to rest on the belt, causing the sack to move with the belt.

4. In a supporting apparatus, the combination of a frame, a pair of shafts mounted in said frame, a platform mounted on each of said shafts, a jack shaft connecting said pair of said shafts, a locking dog mounted on said jack shaft, a spring latch engaging said locking dog, a crank engaging said spring latch, means for rocking said crank, said crank disengaging said spring latch from said locking dog on the rocking thereof.

5. In a supporting apparatus, the combination of a frame, a pair of shafts mounted in said frame, a platform supported by each of said shafts, a jack shaft connecting said pair of shafts, a locking dog carried on said jack shaft, a spring latch engaging the periphery of said locking dog, a crank pin projecting between said crank pin and the periphery of said locking dog, said crank pin being adapted to separate said spring latch from the periphery of said locking dog and release said locking dog.

In testimony whereof I affix my signature.

JOHN W. EVANS.